United States Patent [19]

Heilman

[11] 3,890,282

[45] June 17, 1975

[54] METHOD OF PREPARING HANDLEABLE, MOLDABLE RESIN COMPOSITIONS

[75] Inventor: William J. Heilman, Allison Park, Pa.

[73] Assignee: Gulf Research & Development Company, Pittsburgh, Pa.

[22] Filed: June 15, 1973

[21] Appl. No.: 370,366

[52] U.S. Cl. ...... 260/78.5 T; 117/161 UT; 161/170; 264/216; 264/265; 264/331; 264/DIG. 42; 264/DIG. 59; 260/875; 260/878 R
[51] Int. Cl. ...... C08f 1/86; C08f 15/40; C08f 47/00
[58] Field of Search ............... 260/78.5 T; 161/170; 117/161 UT, 161 ZB; 264/265, 216, DIG. 42, DIG. 59, 331

[56] References Cited
UNITED STATES PATENTS 3,441,543    4/1969    Heilman........................... 260/78.5
3,594,354    7/1971    Hazen et al....................... 260/78.5

*Primary Examiner*—Joseph L. Schofer
*Assistant Examiner*—John Kight

[57] ABSTRACT

A method for the vinyl polymerization of a mixture comprising a polyanhydride resin such as the copolymer of maleic anhydride and 1-hexene or styrene, an olefinically unsaturated monooxirane compound such as glycidyl methacrylate and an olefinically unsaturated hydrocarbon capable of polymerization by free radical means such as styrene at a temperature of about 80° to about 120° C. without significant anhydride-epoxide reaction. A chemical free radical initiator such as benzoyl peroxide is used for the vinyl polymerization. The resulting composition is capable of being mold cured, particularly when in combination with a substrate such as fiber glass, by reaction of the anhydride and epoxide groups to a solid, infusible resin.

14 Claims, No Drawings

METHOD OF PREPARING HANDLEABLE, MOLDABLE RESIN COMPOSITIONS

This invention relates to a novel method for partially curing a soft, sticky resin composition comprising a polyanhydride resin, an olefinically unsaturated monooxirane compound and an olefinically unsaturated hydrocarbon capable of polymerization by free radical means through the olefin groups. Although the use of the olefinically unsaturated hydrocarbon is not essential, its presence is preferred in the formulation. The soft, sticky resin composition is partially cured by vinyl polymerization through the vinyl group, without significant interreaction of the anhydride and epoxy groups, to produce a handleable, moldable intermediate composition. This intermediate composition is then fully cured by anhydride-epoxide reaction in a second stage to a solid infusible resin. More particularly, this invention relates to a method for the rapid, free radical initiated, partial cure of the resin composition into the handleable, moldable intermediate composition at a temperature from about 80° to about 120° C.

This reaction of the olefinic bonds in the first stage at a temperature of about 80° to about 120° C. without substantial reaction of the anhydride and epoxy groups is unexpected because as the resin composition is heated, anhydride-epoxide reaction begins to occur at about 60° to 70° C. with the anhydrideepoxide reaction rate rapidly increasing as the temperature is raised above this range. Since anhydride-epoxide reaction hinders the moldability of the resin composition and eventually results in gelation and non-moldability, anhydride-epoxide reaction is not desired in making the intermediate composition. In contrast, vinyl polymerization without significant anhydride-epoxide reaction results in a handleable, flowable and moldable material.

I have heretofore published SPI exotherm curves obtained by heating samples of a resin formulation in a constant temperature bath maintained at temperatures between 82° and 100° C. The resin was formulated to contain 26 weight percent of the copolymer of 1-hexane and maleic anhydride, 13 percent glycidyl methacrylate, 60 percent styrene and one percent benzoyl peroxide. A study of the exotherm curves as well as a study of the time required to gel the resin compared to the time required to cure the resin all clearly established that the anhydride-epoxide reaction occurred substantially prior to the vinyl copolymerization in each sample heated by the test method in this constant temperature bath. Notwithstanding this convincing data, I have unexpectedly discovered that the rate of vinyl polymerization can be increased to a rate which is much greater than the rate of anhydride-epoxide reaction. This unexpected apparent reversal or inversion in reaction rates occurs above about 80° and particularly above about 90° C. if the resin composition includes a suitable free radical initiator and is subjected to suitable heat treatment in a relatively thin cross section such as a resin-fiber glass sheet or a resin coated surface. This heat treatment requires that the resin formulation be quickly heated to a reaction temperature of about 80° to about 120° C., it requires that it be maintained at the desired reaction temperature for a predetermined short time without overheating and then it requires that it be quickly cooled below the anhydride-epoxide reaction temperature of about 60°–70° C. Above about 105° C. and particularly above about 120° C. anhydride-epoxide reaction takes place so rapidly, even though slower than the vinyl polymerization, that it is difficult to cool the mixture to stop the cross-linking before substantial gelation has occurred.

The vinyl polymerization results in the formation of linear chain polymer molecules having pendent epoxy groups. It is the objective of this first stage partial cure to form a thermoplastic product comprising an intermolecular mixture of the starting linear polyanhydride molecules and these in situ produced linear molecules of vinyl polymer. This mixture is a flexible, thermoplastic, moldable material. The anhdrideepoxide reaction cross-links the vinyl polymer molecules with the polyanhydride molecules to form a non-flowable gel when a significant number of cross-links are formed and a solid, infusible resin when the cross-linking is more complete. Since the gel component in the intermediate product can interfere with its subsequent mold curing, it is desired that the first stage partial polymerization essentially comprises vinyl polymerization without substantial anhydride-epoxide reaction. The amount of gel can be determined by extracting the non-gel components with a heated ketone solvent in a conventional manner. Substantial anhydrideepoxide reaction is evidenced by the gel's interference in suitable second stage moldability. In the second stage, the anhydride and epoxy groups are reacted at a much higher temperature to produce the rigid, infusible product. The expressions epoxy and oxirane are, in general, used to refer to the three-member ring structure consisting of two carbon atoms and one oxygen atom and epoxide is used in general to refer to compounds containing the epoxy or oxirane group.

The novel procedures described herein is particularly useful in the preparation of sheet molding compound comprising relatively thin sheets of a partially cured mixture of resin and reinforcing fiber. This sheet molding compound is suitable for second stage curing in matching molds to produce fully cured products of minimum thickness and close tolerance and of intricate shape such as auto body parts and the like. The solution of the polyanhydride, the olefinically unsaturated monooxirane compound and the olefinically unsaturated hydrocarbon together with the reinforcing material, such as lass fibers, is a soft, sticky mass. It is very difficult to handle and cannot be conveniently mold cured in one stage because of the handling difficulty and because the resin flows away from the reinforcing material due to its fluidity during molding. In preparing these relatively thin sheets of partially cured resin-fiber mixture, it is convenient to initially deposit or form the sticky resin-fiber mixture on a surface upon which it can be partially cured and from which the partially cured material can be readily removed for mold curing. The surface can be an endless moving belt upon which the resin-fiber mixture is first deposited, then conveyed through a heated oven for the first stage cure, and finally cooled and stripped from the supporting surface and cut to desired size. The sticky resin-fiber mixture can also be placed or formed between two flexible sheets such as plastic film to contain the resin and to permit ease in handling during the first stage polymerization. This backing film can then be conveniently removed at the time the partially cured material is placed in a heated mold for the final cure.

Polymerization of the olefinic double bonds of the olefinically unsaturated components without significant epoxide-anhydride reaction converts the soft, sticky mixture into a flexible, non-tacky material which can be readily stripped from the supporting surface or containing sheets and easily handled, cut, shaped and molded. Furthermore, when this intermediate product is subjected to suitable molding pressure and temperature, the partially polymerized fiber-resin mixture flows uniformly and coherently into intricate mold sections and conforms to the mold prior to polymerization to the hard, infusible product. The sheet of intermediate product, particularly when it is relatively rigid as a result of the particular formulation used and not due to gelation, can also be reduced to chips or particles and used in injection molding equipment.

The resin formulation is partially cured to an intermediate product by using a chemical free radical initiator which can be thermally activated at a temperature between about 80° and about 120° C., preferably about 90° to about 105° C. without a chemical activator or promoter at a rate that will induce vinyl polymerization without substantial anhydride-epoxide reaction at the temperature of partial cure. In this procedure the resin formulation containing the free radical initiator is quickly heated to and maintained at a temperature between about 80° and about 120° C., preferably between about 90° and about 105° C., for the short period of time required to induce sufficient vinyl polymerization to convert the soft, sticky mass into a handleable, mold flowable mixture without sufficient anhydride-epoxide reaction to result in a non-moldable thermoset material. At this point the partially cured intermediate product is quickly cooled to a temperature at which anhydride-epoxide reaction is substantially eliminated. In the second stage the partially cured intermediate product is cured to a solid infusible resin at an elevated temperature by causing epoxide-anhydride reaction and by reinitiating vinyl polymerization, if not completed in the first stage.

It was thought to be impossible to accomplish the substantial polymerization of the olefinic bonds at a temperature substantially higher than the temperature at which significant anhydride-epoxide reaction occurs without a concurrent substantial anhydride-epoxide reaction in view of the elevated temperature involved and the highly exothermic nature of the olefinic double bond polymerization (20–22 K. cal/mol.). Notwithstanding this, I discovered that it was possible to select a chemical free radical initiator having suitable activation characteristics and intercorrelate the activation characteristics, the cure temperature for the partial vinyl cure and the first stage time to cause a rapid, substantial vinyl polymerization while maintaining the cure temperature and then cool the composition before substantial anhydride-epoxide reaction can take place. By this procedure the anhydride-epoxide reaction, which is a cross-linking, thermosetting reaction, is stopped before it can adversely interfere with the moldability of the intermediate composition.

Control of the temperature of the resin mixture in the vinyl polymerization stage within the specified temperature range of about 80° to about 120° C. can be suitably effected by my invention when the resin mixture is in relatively thin cross section, such as in film or sheet form rather than in bulk form. For example, the temperature of a sheet of the resin mixture can be controlled by direct heat conductive contact of one or both sides of the sheet with one or more metal surfaces under temperature control. As a further technique of temperature control, one or both sides of the sheet can be in heat conductive contact with a moving gaseous stream, preferably air, under controlled temperature to either heat or cool the sheet as desired. Thus, one side of the sheet undergoing vinyl polymerization can be in contact with the metal surface and the other side can be in contact with a gas stream. Although the ability to heat and cool the resin composition involves a number of factors in addition to its thickness, superior temperature control is effected when the thickness of the resin mixture undergoing vinyl polymerization is not greater than about ten mm., preferably not greater than about five mm. and most preferably not greater than about three mm.

Suitable free radical initiators include benzoyl peroxide; 2-t.-butylazo-2-cyano-4-methylpentane; 2-t.-butylazo-2,4-dimethoxy-4-methylpentane; t.-butyl peroxy-4-t.-butylazo-4-cyanovalerate; 1,1,3,3-tetramethylbutyl peroxy-2-ethylhexanoate; and the like. The rate of vinyl polymerization is directly related to the rate of free radical formation which is related to the rate of decomposition of the free radical initiator.

In a preferred embodiment the soft, sticky resin-fiber mixture is composited in sheet form between two flexible sheets of a suitable film material, including plastic film such as polyethylene, aluminum foil and the like. The film material serves to contain the resin mixture and permits ease in handling until the first stage polymerization has been effected as described herein to produce the intermediate product. In another preferred embodiment the sheet molding compound is made in a continuous procedure by depositing the resin-fiber mixture on an endless metal, leather, woven, rubber, plastic, and the like, belt which is treated, if necessary, to make the surface non-adherent. The deposit on the moving belt is conveyed through an oven heated to a suitable temperature between about 80° and about 120° C. for an appropriate time and cooled. The resulting sheet molding compound is stripped from the belt and cut into suitable lengths. In order to qualify as sheet molding compound both the resin and fiber material in the intermediate product must be capable of flowing together in matched molds under heat and pressure to conform to intricate shapes. This requires that the intermediate resin must not be too thin to flow away from the fibers or so viscous that it cannot flow at the conditions of final cure. A satisfactory sheet molding compound requires that the resin flow freely in the mold carrying the fibers with it to produce a homogeneous final product.

One substantial advantage resulting from this invention is that sheet molding compound can be made much more rapidly than by other procedures. For example, it can be made in times measured in seconds or a few minutes in contrast with the many minutes of even hours required by prior procedures. If too low a temperature is used for the particular free radical initiator, so much time will be required to get sufficient vinyl polymerization to make the composition handleable that significant epoxide-anhydride reaction will occur and render it poorly or non-moldable If the temperature is raised to an appropriate temperature within the specified range for an appropriate shortened period of time using the same free radical initiator, there will be substantial vinyl polymerization and insignificant epoxy-anhydride reaction. To exemplify this free radical-temperature-time dependence a resin-fiber glass formulation, as described herein, was partially cured by vinyl polymerization using benzoyl peroxide at a curing temperature of 100° C. for 3 minutes, then quickly cooled below 80° C. This intermediate product was finally cured to a good molding. When a temperature of 80° C. was used for the partial cure with the same mixture, 10 minutes was required to thicken the resin prior to cooling it. But in this example the final cure produced a poor molding.

The handling and molding characteristics of this intermediate, partially polymerized product are a function of the raw materials used, their relative proportions, the free radical initiator used, the curing temperature and time, the amount of olefinic polymerization, the amount of anhydride-epoxide polymerization and the like. Thus it is seen that significant control of the properties and characteristics of the intermediate product can be effected by means of these variables.

A preferred solid polyanhydride, which is used in conjunction with the olefinically unsaturated monooxirane compound and the monoolefin capable of polymerization by free radical means, is prepared by the copolymerization of maleic anhydride or a related compound with one or more alpha-olefins. The resulting solid polyanhydride is a mixture of polymerized molecules of different chain lengths which can be represented by the general formula:

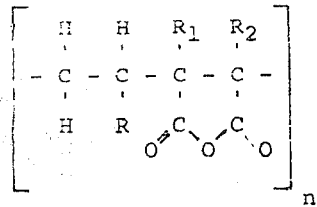

wherein $n$ is between two and about 500, preferably between about two and about 200, R is hydrogen, halogen or straight or branched chain alkyl or halogenated alkyl, having from one to about 18 carbon atoms, and $R_1$ and $R_2$ are independently selected from hydrogen, halogen, alkyl having from one to four carbon atoms and phenyl.

Another preferred solid polyanhydride is represented by the general formula:

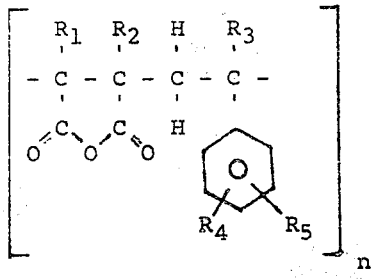

wherein $n$, $R_1$ and $R_2$ are defined above, $R_3$ is hydrogen, chlorine, bromine or methyl and $R_4$ and $R_5$ are independently selected from hydrogen, chlorine, bromine, lower alkyl having from one to four carbon atoms, methoxy and ethoxy.

Examples of olefin compounds of mixtures of olefins which are preferred to form the solid polyanhydride components of the composition of this invention include: ethylene, vinyl chloride, 1-propene, 1-butene, 1-pentene, 1-hexene, 1-heptene, 1-octene, 1-nonene, 1-decene, 5-chlorohexene-1, 1-undecene, 1-dodecene, 1-tridecene, 1-tetradecene, 1-octadecene, and mixtures thereof, and the like. Also included are styrene; p-bromostyrene; 2,5-dichlorostyrene; p-isopropylstyrene; 4-t.butylstyrene; 4-ethoxystyrene; 4-methoxystyrene; alphamethylstyrene; alphachlorostyrene, mixtures thereof, and the like. Other useful olefins are methyl vinyl ether, the olefins obtained by cracking hydrocarbon waxes, and the like.

Examples of compounds which are related to maleic anhydride and which can be used to form the solid polyanhydride components of the invention include: chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride, and the like.

Additional useful polyanhydrides, including constituents from which they are formed, are described and encompassed in the definition of U.S. Pat. No. 3,441,543 at column 2, line 64 to column 8, line 53, which is incorporated herein by reference as a part of this disclosure. The polyanhydride that is useful herein is broadly defined herein as well as in said patent as a solid compound containing at least two succinic anhydride groups and less than three conjugated double bonds when one of the conjugated double bonds is between the carbon atoms alpha to the carbonyl groups in a succinic anhydride group.

The solid polyanhydride is made by the copolymerization of the olefinic compound and the maleic anhydride derivative. The copolymerization can be conducted in any suitable manner. One suitable copolymerization procedure involves contacting the olefinic compound with the anhydride compound in a suitable solvent in the presence of a free radical producing catalyst, such as a peroxide. The molar ratio of the olefin to anhydride in the polyanhydride is desirably between about 1:1 and about 4:1, preferably about 1.5:1 to about 2.5:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e., −80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The polyanhydride copolymer can be produced in any suitable solvent which at least partially dissolves both of the reaction components. Suitable solvents include, for example, n-pentane, n-hexane, n-octane, toluene, benzene, cumene, xylene, anisole, acetone, tetrahydrofuran, cyclohexane, n-propylacetate, ethylbenzene, di-n-butylether, n-amylacetate, cyclohexanone, bromobenzene, ethylbenzyether, and the like, methylene chloride, di-isopropyl ether, carbon tetrachloride, methylcyclohexane, ethyl-n-butyrate, tetrachloroethylene, methylorthotolylether, methyl ethyl ketone.

The catalyst to employ in making the polyanhydride can be any free radical producing material well known in the art. Preferred catalysts are the organic peroxides, such as benzoyl, lauryl and tertiary butyl peroxide. Other suitable free radical producing materials include substituted azo compounds, such as alpha-alpha'-azobis-isobutyronitrile.

As the olefinically unsaturated monooxirane compound, we prefer to use glycidyl acrylate or glycidyl methacrylate. Other useful monooxiranes are disclosed in U.S. Pat. No. 3,441,543 at column 9, line 39 to column 11, line 75, which is incorporated herein by reference as a part of this disclosure.

The compositions also optionally but preferably comprise an olefinically unsaturated monomeric compound free of oxirane oxygen atoms and containing as its only functional group at least one olefinic double bond capable of polymerization by free radical means. Olefinically unsaturated monomeric compounds which polymerize by a free radical mechanism are well known in the art and are generally alpha-olefinically unsaturated compounds which contain substituents directly connected to the beta-carbon atom of the alpha-olefin, which substituents activate the alpha-olefin double bond for polymerization by effecting a net electron withdrawal from the olefinic double bond. Electron withdrawal groups are well known in the art and include halogen, aromatic radical, nitrile, and the like, as disclosed in U.S. Pat. No. 3,441,543 at column 12, lines 1 to 61 and column 13, line 49 to column 15, line 65 which is incorporated herein by reference as a part of the disclosure.

Examples of preferred olefinically unsaturated compounds defined above include styrene, p-chloro- and bromostyrene, 2,5-dichlorostyrene, p-isopropylstyrene, 4-methoxystyrene, 4-ethoxystyrene, p-nitrostyrene, 4-t.-butylstyrene, and the like, and mixtures of these.

The olefinically unsaturated monooxirane compound and the olefinically unsaturated monomer free of oxirane oxygen atoms preferably must have reactivity ratios of one or less for superior results. If a reactivity ratio is greater than one, the olefinically unsaturated monomer preferentially reacts with itself. When the reactivity ratio is one, the monomer shows no preference in its reaction partner. When the reactivity ratios are less than one, each olefinically unsaturated monomer prefers to react with the other type of monomer. Thus, in the case of a mixture of glycidyl methacrylate and styrene the reactivity ratios are less than one, therefore, the resulting copolymer is a polyepoxide which comprises randomly distributed glycidyl methacrylate and styrene molecules on each chain.

In general, it is preferred that the polyanhydride, the olefinically unsaturated monooxirane compound and the olefinically unsaturated hydrocarbon form a liquid solution below 70° C. and more preferably at about room temperature in order to obtain a final, cross-linked resin which is homogeneous and grain-free. Since the polyanhydride is a sold at room temperature, it is necessary that at least one of the olefinically unsaturated compounds be liquid at room temperature in order to dissolve the other two components and it is preferred that both of the olefinically unsaturated compounds be liquid at room temperature. Additionally, the liquids must be mutually soluble and capable of solubilizing the solid polyanhydride.

As indicated, the relative proportions of the three primary constituents, that is, the polyanhydride, the olefinically unsaturated monooxirane compound and the olefinically unsaturated hydrocarbon affect the properties as well as the handling and molding characteristics of the intermediate, olefin-polymerized product. These relative proportions can also have a significant effect on the properties of this final cured, cross-linked product as well as the overall cost. In general, the molar ratio of the polyanhydride to monoepoxide compound that can be employed in the compositions varies over a fairly wide range. Since the polyanhydride is a mixture of moleculeus of different sizes and numbers of anhydride groups, the anhydride to epoxide equivalent ratio, i.e., the A/E ratio, is used to express the relative proportions of anhydride and epoxide groups present in the liquid resin composition. The A/E ratio of one mol of maleic anhydride and one mol of glycidyl methacrylate is 1.0. In the compositions described herein the A/E ratio can suitably be between about 0.1:1 and 5:1, but is preferably between 0.3:1 and 2:1 and more preferably between about 0.5:1 and 1.5:1.

The amount of the olefinically unsaturated monomer without epoxide functionality can vary between 0 and about 4 parts by weight per part of the olefinically unsaturated monooxirane compound and preferably between about 0.25 and about 2 parts per part of the monooxirane compound. These figures relate solely to the free olefinically unsaturated monomer used in forming the initial homogeneous resin solution and do not relate to the olefinically unsaturated material from which the polyanhydride is formed by copolymerization. The maximum amount of any particular unsaturated monomer to employ will depend upon its compatibility in the final product, that is, the intersolubility of the components. Thus, it has been found that the lower the A/E ratio when using glycidyl methacrylate, the greater the amount of styrene that can be used.

As pointed out, polymerization of the double bond is highly exothermic. In view of this, care must be exercised in order that the material does not heat high enough in the first stage polymerization to cause a significant anhydride-epoxide cross-linking reaction such that the material cannot be easily handled or molded. When the fiber-resin mixture has been laid down in thin sheets, the exothermic heat of reaction is more readily dissipated than when thick sheets are used. Since chemical free radical initiators generate free radicals at different rates, polymerization can, in part, be controlled by correlating the chemical initiator used, the time and temperature of the partial cure and the amount of the chemical initiator. Generally I have found that from about 0.01 to about 5 parts by weight of the free radical initiator per 100 parts of the olefinic constituents will effect vinyl polymerization and preferably about 1 to 3 parts are used.

It may be desirable to incorporate in the initial mixture a plasticizer or a plasticizing monomer which possesses the ability to enhance the flow characteristics during molding. Such plasticizing components include epoxidized vegetable oils such as epoxidized soy bean oil, di-2-ethylhexyl phthalate, dioctyl phthalate, dihexyl phthalate, di-isooctyl phthalate, polyethylene glycols such as those having a molecular weight between 600 and 1,000 Nadic Methyl Anhydride, phenyl glycidyl ether, alkyl glycidyl ethers such as octyl and decyl glycidyl ethers and the like. Refrigeration of the first stage product will reduce polymerization during storage. Generally when the first stage polymerization is carried out as part of an integrated operation, the molding operation is carried out relatively soon in an adjacent unit. In this instance holding time presents no problem. However, when the first stage product is not used immediately, a plasticizer or a plasticizing monomer can be useful.

The second stage curing accomplishes a cross-linking of the polyanhydride chains and the polyepoxide chains through the anhydride and epoxide functions. Curing temperatures are suitably between about 80° and about 200° C., preferably between about 100° and about 150° C. For quick cures it is most preferred to use a curing temperature toward the upper end of the range. The curing time generally is between 30 seconds and 8 hours depending on the curing temperature, the resin composition and the like. Curing in stages, that is, at different temperatures, can be utilized, however, for simplicity and convenience one stage curing is preferred. Although pressure is not required for the second stage curing, it is usually involved when the intermediate product is mold cured and fortuitously the physical properties of the finally cured product are improved by curing under pressure. Pressures as high as 5,000 p.s.i. and higher are usable herein.

As previously indicated, the resin composition is preferably formed in sheets using a fibrous binder or reinforcing agent. Fiber glass is one of the preferred fibrous materials. It can be used in the form of a woven glass fabric or randomly distributed glass fibers. When chopped glass fibers or other randomly distributed fibers are used, they can suitably range from one-eighth inch (3 mm.) to 2 inches (50 mm.) in length or more and preferably from about one-fourth inch (6 mm.) to about 1 inch (25 mm.) in length. Other fibrous material can be used as the core or binder in the form of randomly distributed fibers, fluff, paper, woven fabric, etc. The binder can be a natural material such as cellulose, including sisal, hemp, cotton and linen, asbestos, and the like, or a synthetic such as nylon, polyester, polyolefin, and the like. Randomly distributed fibrous reinforcing material is preferred for use in sheet molding compound which requires flow during molding to conform to the mold while fibrous reinforcing material in sheet or fabric form is particularly useful in the preparation of laminates.

Fiber glass in various forms is well known and commercially available for resin-fiber glass compositions. A lubricant or finish is generally applied to the fiber glass filaments by the manufacturer. It is preferred that the fiber glass filaments comprising the fiber glass material used as the core or binder having a coating or finish which is reactive under the curing conditions with at least one of the resin forming components. The silane finishes are preferred because they are chemically bonded to the glass filaments and have free reactive groups available for reaction with the resin.

The resin compositions can contain constituents in addition to the monomers and core material such as pigments or dyes for coloring the finished product, plasticizers as mentioned, fillers and the fillers The fillers provide the desirable function of reducing the cost of the final product without significantly reducing the physical properties. Suitable filler material includes powdered calcium carbonate, clay, sands, powdered metals such as aluminum and iron, metal oxides such as iron ozide, alumina, and the like, powdered silica, wood flour, walnut shell flour, and the like. The filler is preferably inert in the composition, that is, it should not react with any of the reactants or catalyze a reaction involving the reactants. Other additives which can be used are a suitable mold release agent or a material such as poly(methyl methacrylate) or finely ground polyethylene to impart a low profile, that is, a smooth surface, to the finally cured product.

The following examples are set out to illustrate the novel process and compositions of the invention and to provide a better understanding of their details and advantages.

I have found that a polyanhydride prepared from maleic anhydride and an olefin such as hexene-1 or styrene is highly suitable herein. I have also found glycidyl methacrylate to be very suitable as the unsaturated monooxirane compound and styrene as the unsaturated hydrocarbon. The polyanhydride is a solid at room temperature and is soluble in the glycidyl methacrylate and a glycidyl methacrylate-styrene solution but not styrene alone. Therefore, I find it convenient to mix the polyanhydride in a glycidyl methacrylate-styrene solution.

The 1-hexene-maleic anhydride copolymer used in the following examples are prepared by reacting 1-hexene and maleic anhydride in a molar ratio of about 2:1 in the liquid phase. The reaction was carried out in the presence of a mutual solvent at a temperature between 60° and 100° C. using as a catalyst between two and three weight percent benzoyl peroxide based on the maleic anhydride. The copolymer was separated from the solvent and any residual catalyst, and then dried. Infrared and nuclear magnetic resonance analysis showed the 1-hexene and maleic anhydride to have combined in a 1:1 molar ratio.

Room temperature, as used herein, means a temperature between about 20° and about 25° C. The cup mold referred to in the following examples is described in ASTM D731-57. It is designed to measure the molding index of stiff flow thermosetting plastics. The cup mold provides a very useful means for determining the ability of the resin-fiber mixture to flow in a mold as a mixture without segregation of the resin and fiber and for determining the effect on moldability by varying the formulation. Also the cup mold is very useful for determining the batch-to-batch uniformity of identical formulations. The mold release agent used in the examples was Mold Wiz 18-36, a commercial product sold by Axel Plastics Research Laboratories, Inc., of Long Island City, New York.

Heating and temperature control of the sheet molding compound in the following examples was accomplished by the use of opposing metal platens under minor pressure to serve as a heat source and heat sink. The maintenance of the constant desired temperature was verified by a thermocouple embedded in the center of representative examples.

EXAMPLE 1

A resin composition was made by mixing 200 grams styrene, 112 grams glycidyl methacrylate, 39 grams of maleic anhydride and 145 grams of the 1-hexene-maleic anhydride copolymer described above. After solution was obtained, an additional 354 grams of styrene were dissolved in to give a final resin composition comprising 65.2 weight percent styrene, 13.2 percent glycidyl methacrylate, 4.6 percent maleic anhydride and 17 percent polyanhydride. To 800 grams of this resin composition were added 8 grams of benzoyl peroxide, 16 grams of an internal mold release agent and 800 grams of powdered calcium carbonate filler. The resulting mixture was a readily flowable liquid which was creamy in consistency.

This filled resin composition was sprayed up onto a sheet of 18 inch by three foot aluminum foil together with about one inch long chopped fiber glass using a conventional spray-up gun with attached fiber glass roving chopper to a thickness of about five mm. The sprayed up composition was a viscous, sticky mass. Analysis of a sample showed that the sprayed up composition was 27.9 weight percent resin, 27.9 percent filler and 44.2 percent glass.

The sprayed up composition was partially cured by heating to 100° C for 5 minutes and then cooled to room temperature. This partially cured intermediate product was easily handled, was non-tacky and could be readily cut and shaped. A study was undertaken to determine the extent of anhydride-epoxide cross-linking resulting from the partial cure and also the extent of cross-linking taking place upon standing at room temperature. A first sample of the intermediate product was immediately subjected to extraction in methyl ethyl ketone, a second sample was extracted after standing for three hours at room temperature and a third sample of the intermediate product was extracted after standing for three days at room temperature. Each sample was extracted for one week in a Soxhlet extractor using methyl ethyl ketone. Following extraction the first sample was found to have no gel, the second sample contained three percent gel and the third sample contained 34.3 percent gel.

A fourth 105 gram sample of the intermediate product was fully cured two hours after the partial cure had been effected. This sample was cured in the cup mold at 320° F. (160° C.) for five minutes. The flow of the material in the mold was excellent, the uniformity of the molded product was excellent and the general appearance of the surface of the molded product was good.

EXAMPLES 2-8

A series of compositions were tested at different conditions of partial cure. The resin component was prepared by mixing 100 parts by weight of the 1-hexene-maleic anhydride copolymer, 77 parts of glycidyl methacrylate, 380.4 parts of styrene, 27.2 parts of maleic anhydride and 0.06 part (0.2 part in Example 8) of hydroquinone to inhibit styrene polymerization. The polymerization mixture was prepared by mixing 100 parts of the resin component, one part of benzoyl peroxide, 100 parts of powdered calcium carbonate, 5.3 parts of powdered asbestos, 2 parts of mold release agent, 100 parts of one-fourth inch (6.4 mm.) glass fiber and one part (10 parts in Example 8) of powdered polyethylene as a low profile agent. These constituents were manually mixed together in a polyethylene bag to a sticky mass having a putty-like consistency. They were next spread out on a sheet of aluminum foil to a thickness of about three mm. and then covered with a second sheet of aluminum foil. The results of the partial cure and the subsequent final cure in the cup mold are set out in Table I. The final cure was not undertaken when the initial cure did not produce a handleable intermediate product. The quality of the final molding was an overall evaluation involving as items considered, the flow of material in the mold, the uniformity of the molded product, the release from the mold and the general appearance of the molded product.

Table I

| Example | 2 | 3 | 4 | 5 |
|---|---|---|---|---|
| Partial Cure | | | | |
| T. °C. | 80 | 80 | 90 | 100 |
| Time, min. | 5 | 10 | 5 | 1 |
| Result | incomplete | handleable | incomplete | incomplete |
| Final Cure | | | | |
| T. °C. | — | 160 | — | — |
| Time, min. | — | 7 | — | — |
| Quality | — | poor | — | — |

| Example | 6 | 7 | 8 |
|---|---|---|---|
| Partial Cure | | | |
| T. °C. | 100 | 100 | 100 |
| Time, min. | 2 | 3 | 5 |
| Result | handleable | handleable | handleable |
| Final Cure | | | |
| T. °C. | 154 | 149 | 160 |
| Time, min. | 5 | 5 | 5 |
| Quality | fair | good | good |

EXAMPLE 9

A resin composition was prepared by mixing 253.6 grams of styrene, 51.3 grams of glycidyl methacrylate, 66.7 grams of a styrene-maleic anhydride copolymer having a styrene to maleic anhydride ratio of about 2:1 (M.W. 1,600-1,800) and 18.1 grams of maleic anhydride. A 100 gram portion of this resin composition was mixed with one gram of 2-t.-butylazo-2-cyano-4-methylpentane, two grams of carbon tetrachloride, two grams of mold release agent, 100 grams of powdered calcium carbonate and 100 grams of one-fourth inch (6.4 mm.) glass fibers. This polymerization mixture was kneaded in a plastic bag to a sticky, putty-like mass. It was then worked out onto a sheet of aluminum foil into a layer about 3 mm. thick. A second layer of aluminum foil was placed on top, primarily to contain the mixture and to reduce styrene evaporation.

The mixture was heated to 100° C. for 12 minutes to partiall cure the polymerization mixture. This partially cured product was non-sticky, was easily handled and was easy to pressure mold. A portion was placed in the cup mold and cured at 300° F. (149° C.) for 5 minutes. The cup molding was evaluated to be fair based on an evaluation of the flow of material in the mold, the uniformity of the molded cup, its release from the mold and the general appearance of the molded cup.

EXAMPLE 10

The formulation and conditions of Example 9 were repeated except that the free radical initiator was 2-t.-butylazo-2,4-dimethoxy-4-methylpentane and the partial cure was at 100° C. for 15 minutes. This cup molding was also evaluated to be fair based on the same considerations.

EXAMPLE 11

The formulation and conditions of Example 9 were repeated except that the free radical initiator was t.-butylperoxy-4-t.-butylazo-4-cyanovalerate and the partial cure was at 100° C. for 15 minutes. This cup molding was superior to the two immediately preceding examples and was evaluated to be good on the same considerations.

EXAMPLE 12

A resin composition was made up as described in Example 9 using 190.2 grams of styrene, 38.5 grams of glycidyl methacrylate, 50 grams of the styrene-maleic anhydride copolymer and 13.6 grams of maleic anhydride. The polymerization mixture utilized 100 grams of this resin composition, 3 grams of carbon tetrachloride, 2 grams of the mold release agent, 100 grams of powdered calcium carbonate, 100 grams of one-fourth inch (6.4 mm.) glass fiber, 1 gram of benzoyl peroxide and 0.4 gram of 3-picoline. The partial cure was carried out at 100° C. and 5 minutes to a handleable product. After standing at room temperature for 24 hours, it was cup molded at 300° F. (149° C.) for seven minutes. The cup molding was evaluated to be good using the same considerations as previously described.

EXAMPLE 13

A resin composition was preparped from 190.2 grams of sytrene, 38.5 grams of glycidyl methacrylate, 13.6 grams of maleic anhydride and 50 grams of the 1-hexene-maleic anhydride copolymer. The polymerization mixture was prepared in a sheet as described in Example 9 using 100 grams of this resin composition, 2 grams of the mold release agent, 100 grams of powdered calcium carbonate, 100 grams of one-fourth inch (6.4 mm.) glass fiber and 0.3 gram of 1,1,3,3-tetramethylbutylperoxy-2-ethylhexanoate. The mixture was partially cured at 90° C. for 1 minute to a handleable product. It was then finally cured at 160° C. for 5 minutes in the cup mold. The cup molding was determined to be fair based on the same considerations previously explained.

EXAMPLE 14

A second sheet of polymerization mixture was prepared using the same formulation as described in Example 13. This mixture was partially cured at 100° C. for 5 minutes and was then cured in the cup mold at 160° C. for 5 minutes. The cup molding was determined to be good using the same evaluation.

It is to be understood that the above disclosure is by way of specific example and that numerous modifications and variations are available to those of ordinary skill in the art without departing from the true spirit and scope of my invention.

I claim:

1. A method of preparing a handleable, thermosettable, moldable composition which comprises forming a liquid solution of
    a polyanhydride containing at least two succinic anhydride groups and less than three conjugated double bonds when one of the conjugated double bonds is between the carbon atoms alpha to the carbonyl groups in a succinic anhydride group;
    an olefinically unsaturated monooxirane compound containing as its only functional groups a single oxirane oxygen atom and an olefinic double bond capable of being polymerized by free radical means;
    an olefinically unsaturated monomer free of oxirane oxygen atoms and containing as its only functional groups at least one olefinic double bond capable of polymerization by free radical means; and
    a chemical free radical initiator which is thermally activated to generate free radicals at a temperature between about 80° C. and about 120° C.; and
polymerizing at least a portion of said olefinic double bonds of said olefinically unsaturated monooxirane compound and said olefinically unsaturated monomer by free radical means without substantial polymerization of the anhydride groups and the epoxide groups present in the mixture by heating the resin mixture at a thickness no greater than about 10 mm. to a temperature between about 80° C. and about 120° C. and controlling the temperature of the resin mixture within said range whereby substantial vinyl polymerization takes place and cooling the reaction mixture below about 60° C. whereby a handleable, thermosettable, moldable composition comprising a homogeneous mixture of polyanhydride molecules, polyepoxide molecules and any unreacted olefinically unsaturated monooxirane compound and olefinically unsaturated monomer is obtained.

2. A method in accordance with claim 1 in which a fibrous substrate is incorporated into said resin mixture.

3. A method in accordance with claim 2 in which the fibrous substrate is fiber glass.

4. A method in accordance with claim 3 in which the temperatures are between about 90° C. and about 105° C.

5. A method in accordancew with claim 4 in which the free radical initiator is benzoyl peroxide.

6. A method in accordance with claim 3 in which the resin mixture is heated at the polymerization temperature from about one to about 15 minutes.

7. A method in accordance with claim 3 in which the polyanhydride is represented by the general formula:

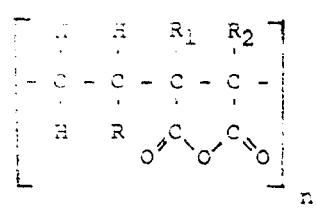

wherein $n$ is between 2 and about 500, R is hydrogen, halogen or a straight chain alkyl or halogenated alkyl group having from 1 to 18 carbon atoms, and $R_1$ and $R_2$ are independently selected from hydrogen, halogen, alkyl having from one to four carbon atoms and phenyl.

8. A method in accordance with claim 7 in which $R_1$ and $R_2$ are hydrogen, the olefinically unsaturated monooxirane compound is glycidyl acrylate or glycidyl methaerylate and the olefinically unsaturated monomer is styrene.

9. A method in accordance with claim 3 in which the polyanhydride is represented by the general formula:

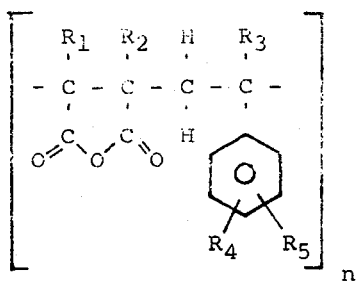

wherein $n$ is between two and about 500, $R_1$ and $R_2$ are independently selected from hydrogen, halogen, alkyl having from one to four carbon atoms and phenyl, $R_3$ is hydrogen, chlorine, bromine or methyl and $R_4$ and $R_5$ are independently selected from hydrogen, chlorine, bromine, lower alkyl having from one to four carbon atoms, methoxy and ethoxy.

10. A method in accordance with claim 9 in which $R_1$, $R_2$, $R_3$, $R_4$, and $R_5$ are hydrogen, the olefinically unsaturated monooxirane compound is glycidyl acrylate or glycidyl methacrylate and the olefinically unsaturated monomer is styrene.

11. A method in accordance with claim 4 in which the handleable, thermosettable, moldable composition is formed in a thickness no greater than about 5 millimeters.

12. A method in accordance with claim 4 in which the handleable, thermosettable, moldable composition is formed in a thickness no greater than about 3 millimeters.

13. A method in accordance with claim 4 in which the anhydride to epoxide equivalent ratio is between about 0.1:1 and about 5:1 and the amount of olefinically unsaturated monomer is between about 0 and about 4 parts by weight per part of the olefinically unsaturated monooxirane compound.

14. A method in accordance with claim 13 in which the anhydride to epoxide equivalent ratio is between about 0.5:1 and about 1.5:1 and the amount of olefinically unsaturated monomer is between about 0.25 and about 2 parts by weight per part of the olefinically unsaturated monooxirane compound.

* * * * *

UNITED STATES PATENT OFFICE
CERTIFICATE OF CORRECTION

PATENT NO. : 3,890,282
DATED : June 17, 1975
INVENTOR(S) : William J. Heilman

It is certified that error appears in the above-identified patent and that said Letters Patent are hereby corrected as shown below:

Col. 1, line 12, "vinyl group" should read --vinyl groups--.
Col. 1, line 27, "anhydrideepoxide" should read --anhydride-epoxide--.
Col. 1, line 56, "80°" should read --80° C.--.
Col. 2, line 12, "anhdrideepoxide" should read --anhydride-epoxide--.
Col. 2, line 24, "anhydrideepoxide" should read --anhydride-epoxide--.
Col. 2, line 34, "procedures" should read --procedure--.
Col. 2, line 45, "lass fibers" should read --glass fibers--.
Col. 3, line 1, "epoxideanhydride" should read --epoxide-anhydride--.
Col. 3, line 52, "first stage time" should read --first stage cure time--.
Col. 6, line 36, "olefinic compound" should read --olefin compound--.
Col. 7, line 11, "ethylbenzyether" should read --ethylbenzylether--.
Col. 10, lines 8 and 9, "fillers and the fillers. The filleris" should read --fillers and the like. The fillers--.
Col. 10, line 14, "iron ozide," should read --iron oxide,--.
Col. 10, line 39, "are prepared" should read --was prepared--.
Col. 11, line 7, "made" should read --made up--.
Col. 12, line 61, "partiall" should read --partially--.
Col. 13, line 37, "preparped" should read --prepared--.
Col. 14, line 48, claim 5, "accordancew" should read --accordance--.
Col. 15, line 5, claim 8, "methaerylate" should read --methacrylate--.
Col. 16, line 7, claim 11, "4" should read --3--.
Col. 16, line 11, claim 12, "4" should read --3--.
Col. 16, line 15, claim 13, "4" should read --3--.

Signed and Sealed this seventh Day of October 1975

[SEAL]

Attest:

RUTH C. MASON
Attesting Officer

C. MARSHALL DANN
Commissioner of Patents and Trademarks